June 12, 1934.   E. G. STRECKFUSS   1,962,847
BREAD SLICER
Filed Jan. 13, 1930   4 Sheets-Sheet 1

Elmer G Streckfuss INVENTOR.

BY

Allen & Allen ATTORNEYS

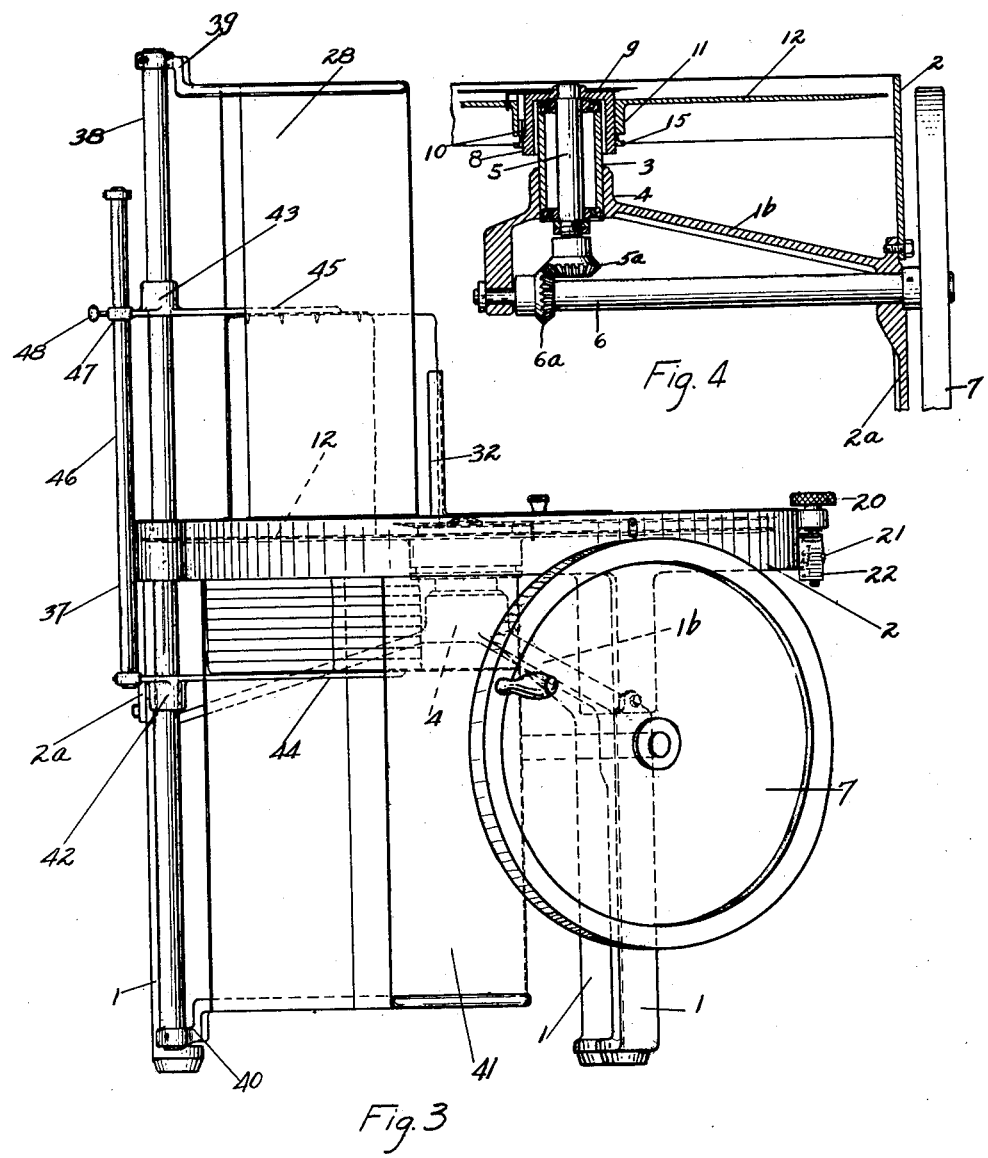

June 12, 1934.   E. G. STRECKFUSS   1,962,847
BREAD SLICER
Filed Jan. 13, 1930   4 Sheets—Sheet 3
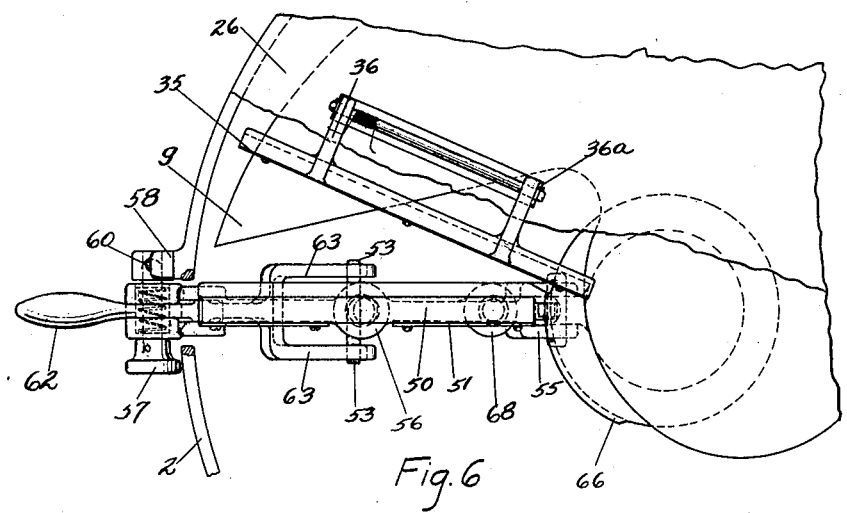
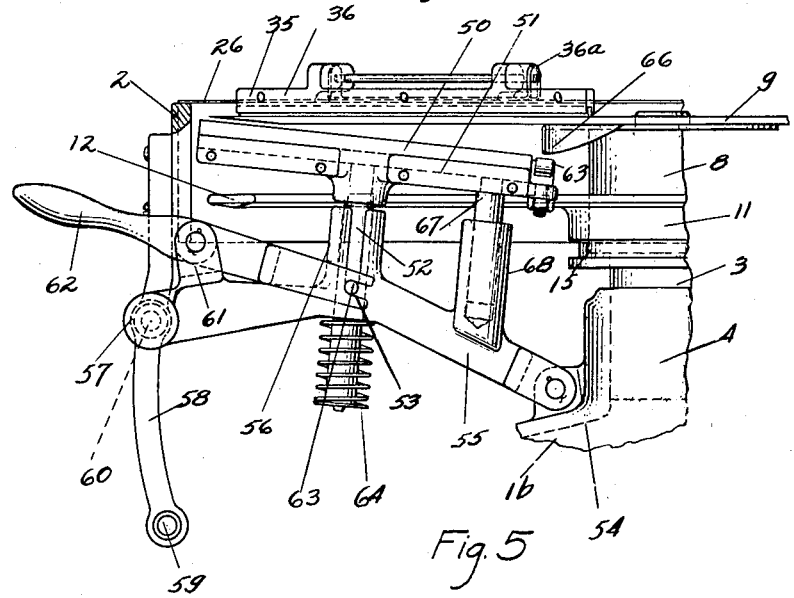

June 12, 1934.  E. G. STRECKFUSS  1,962,847
BREAD SLICER
Filed Jan. 13, 1930   4 Sheets-Sheet 4
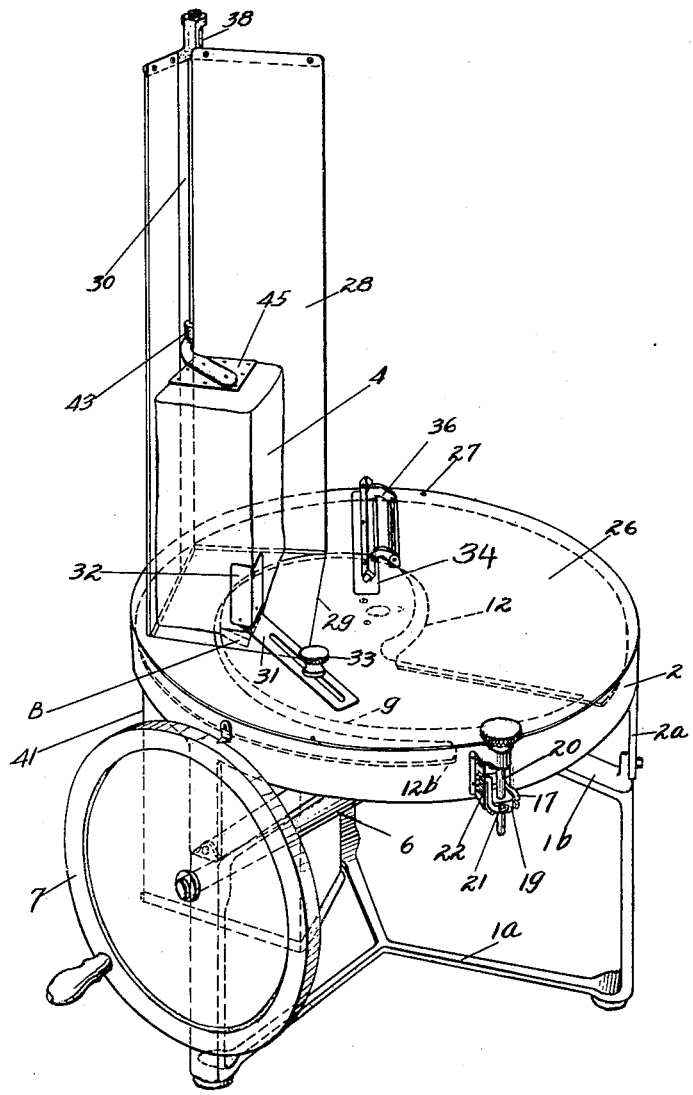
Fig. 8.   Fig. 7
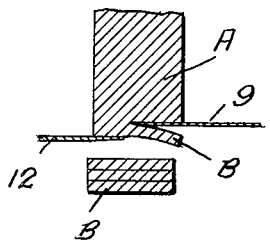
Elmer G Streckfuss INVENTOR.
BY
Allen & Allen ATTORNEYS Patented June 12, 1934

1,962,847

UNITED STATES PATENT OFFICE 1,962,847

BREAD SLICER

Elmer G. Streckfuss, Cincinnati, Ohio, assignor to The Cincinnati Time Recorder Company, Cincinnati, Ohio, a corporation of Ohio Application January 13, 1930, Serial No. 420,549

21 Claims. (Cl. 146—94)

My invention relates to machines for slicing bread and other materials which will be capable of handling in a like mechanism. It has as its objects, the provision of a simple and compact machine, adjustable to various sizes of bread, and capable of making slices of bread of a pre-arranged thickness, very rapidly and accurately.

It is my object, in the machine of my invention, to provide for a spiral shaped edge for the knife, and to feed the bread toward the knife and toward a slice-adjusting plate which rotates with it. In such a mechanism the only movements of the article to be sliced, are in the direction of the knife; and the knife itself moves in a single plane on a fixed center.

Such an arrangement is highly desirable for its simplicity, and while the spiral shaped cutting edge is typical of slicing machines employed many years ago, I am not aware of such a machine in which bread can be properly sliced in the highly successful manner of my machine.

Another feature of my invention is that the bread is fed downwardly toward the knife and slice-adjusting plate, so that gravity is utilized for moving the bread, and also for disposal of the slices. Thus, I am enabled to slice a loaf of bread and deliver the slices below the cutting mechanism in a perfect stack ready to be packed, if desired, in a suitable wrapper, or for separate use in the making of sandwiches, for table use in hotels and restaurants, and the like.

Another feature of my invention is the provision in a machine of the type noted, of a mechanism for sharpening the edge of the spiral blade, without removing the knife from the machine. In my construction, provision is made for getting the slice-adjusting plate out of the way, and for providing the proper sharpening angle for the cutter.

In various other ways, which will be noted, I have provided for the various contingencies and necessities in connection with the slicing of bread and other materials in a spiral blade, vertical type of slicing machine.

I will first describe a typical and preferred construction illustrating the best method now known to me of applying my invention, and will set forth in the appended claims the novelty inherent in the structure illustrated, and specified.

In the drawings:—

Figure 3 is a side elevation of the machine.

Figure 4 is a detail section showing the frame construction and the mounting of the knife and adjusting plate.

Figure 5 is a detail side elevation on a larger scale, showing the sharpening device.

Figure 6 is a plan view of the same parts.

Figure 7 is a perspective view of the complete machine.

Figure 8 is a diagram illustrating the method of disposal of the slices as removed from the loaf of bread.

Figure 1:
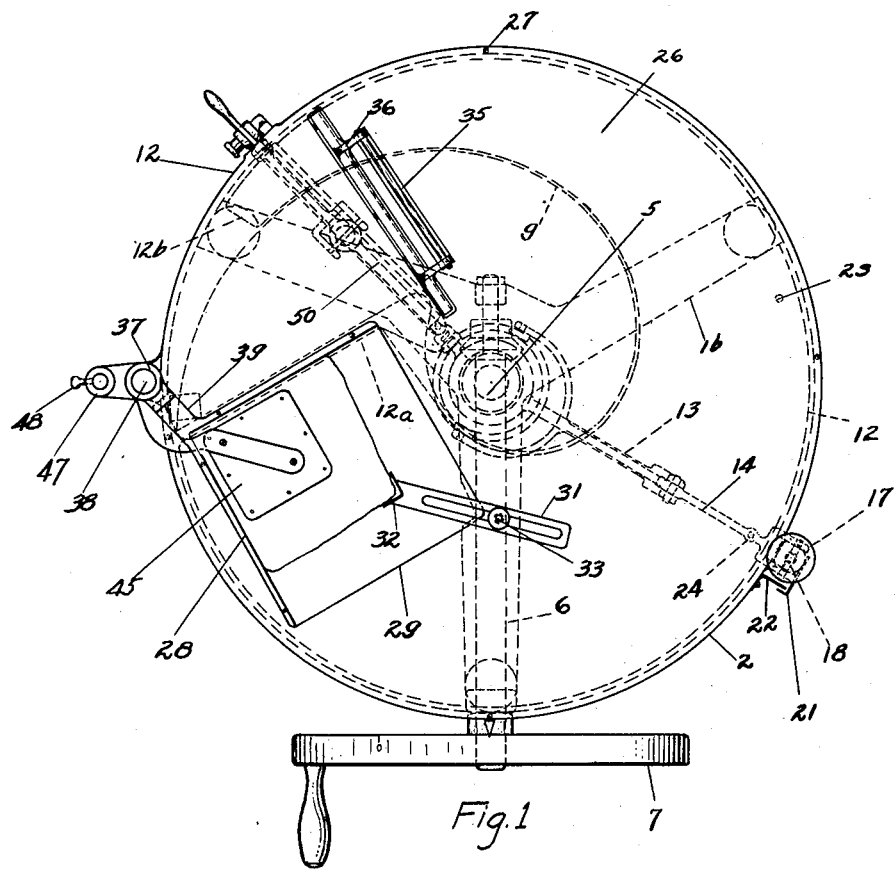
Figure 1 is a top plan view of the device with the cover plate in place.

The machine is formed with a standard consisting in the illustrated embodiment of three legs 1, with a bottom spider 1a and a top spider 1b. A ring 2, which acts as a frame around the operating parts, is provided with legs 2a, which are bolted to the main frame or standard. A journaling sleeve 3 is set into a boss 4 formed in the upper spider 1b of the frame, in which sleeve is supported the shaft 5.

The shaft 5 terminates in a beveled gear 5a, which meshes with a like gear 6a on the hand wheel shaft 6. The shaft 6 is supported in journals in the upper spider frame, and is equipped with a hand wheel 7 by means of which it is operated.

On the upper end of the shaft 5 is fixed a cap or depending sleeve 8, to the top of which the knife 9 is secured. This knife 9 has a spiral cutting edge, and its greatest radius is substantially equal to the radius of the ring frame 2. On the sleeve is a key 10 which engages in a key way on the hub 11 of the slice-adjusting plate 12. This arrangement is such that the plate is driven around with the knife, can be moved to and from the knife, and finally, the key is short enough that the hub of the slice-adjusting plate can be moved down over the sleeve or cap and pass beyond the key entirely, thus permitting the knife to revolve and the slice-adjusting plate to stand still.

To adjust the slice-adjusting plate, I provide a bracket arm 13 on the upper spider frame, which arm journals a lever 14, which lever has a forked end to engage in a groove 15 in the plate hub 11. The lever extends out through a slot 16 in the ring frame, and is equipped with a pair of forked arms 17 that engage over pins 18 on the nut 19 of the adjusting screw 20. This adjusting screw is mounted in a boss on the ring frame, and the nut 19 carries a small indicator arrow 21 that traverses a graduated plate 22 screwed to the ring frame.

This construction is such that when the adjusting screw is revolved, the nut 19, which is not free to revolve on account of the indicator arrow and its engagement with the lever forks, is caused to move up and down along the screw. This moves the indicator arrow and rocks the lever, which forces the hub of the slice-adjusting plate up and down along the keyed sleeve.

In order to drop the plate and hold it against revolution, as is required when sharpening the knife, I have provided for a small hole 23 in the plate, which registers with a small pin 24, located on the lever 14. By lifting the outer end of the lever, after first revolving the plate around until the hole registers with the pin, the plate hub will be dropped beyond the key in its mounting sleeve and the pin will register with the hole. Thereafter, until this operation is reversed, the knife operating shaft can be revolved without moving the adjusting plate.

The shape of the slice-adjusting plate, as best seen in Figure 1, is a complete circular plane from which a space 12a has been cut that is just a little larger than the spiral cutting knife. The end of the hole in the adjusting plate which would be pointed, is cut off flat as at 12b.

In order to practice the operation of the machine, reference is made to Figures 7 and 8. Imagine a piece of bread resting against the slice-adjusting plate just behind the straight back edge of the knife (Figure 8), the bread being held against movement, except vertically. The knife and adjusting plate are then revolved (clockwise with reference to Fig. 8), causing first the inner end of the spiral to enter the bread as the adjusting plate passes under the bottom of the piece. A slice B from the bread loaf A (Fig. 9) will be severed as the knife and plate revolve, with the slice extending between the knife and the adjusting plate, and curving slightly downwardly, as illustrated.

When the knife has cut half way through the bread (which is the position illustrated in Fig. 8) the bread will be extending into the space beneath the knife where there is no adjusting plate, while the remainder of the bread will be resting on the adjusting plate through about half of its width.

Figure 2:
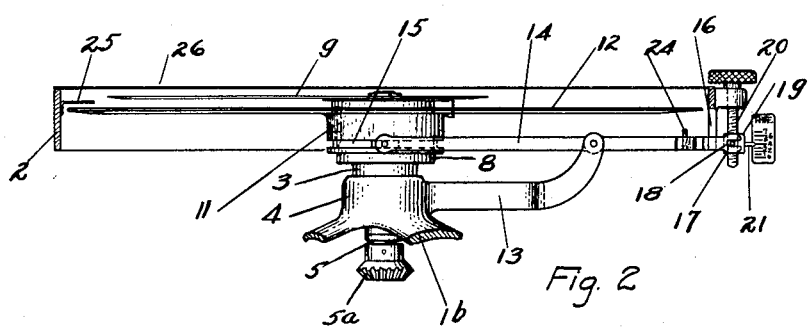
Figure 2 is a detail section showing the relative positions of the knife and slice-adjusting plate, and the adjustment of the latter.

As the slicing cycle is completed, the piece of bread will fall downwardly, and in order to prevent the slice being caught and pulled along by the knife, a tongue 25 (Fig. 2) may be mounted on the inside of the ring frame protruding between the knife and the adjusting plate, which tongue will engage a slice that adheres to the blade and strip it away.

In Fig. 8 the knife is moving to the left, as is the adjusting plate; and it may be noted that the advancing edge of the adjusting plate will not get to a position beneath the slice of bread, because the knife will have completely severed the piece before the said edge of the adjusting plate gets to a position beneath the slice.

To picture the relation of the knife to the adjusting plate, it may be noted that the hole in the adjusting plate is of a size that the knife could be dropped through it, with only a little to spare. Thus, before the other side of the hole in the adjusting plate reaches a position beneath the severed slice of bread, the knife edge will have completed its operation, and the slice will have fallen away.

Located on the top of the ring frame is a cover plate 26, which has pins 27 depending from it that, engaging holes in the top of the ring frame or other means, hold it in position. Held in contact with this cover plate, as will be described, is a triangular housing 28, beneath which housing is an opening 29 in the cover plate 26 that corresponds to the square of which the housing subtends the two sides away from the operator. This housing is slotted lengthwise at 30 to accommodate the bread holding mechanism. A slide 31 having a triangular shoe 32 at its outer end, is secured on top of the cover plate, the adjustment of its position toward and from the housing being accomplished through a slot and screw device 33. This plate holds the outer face of a loaf of bread, which is engaged at the same time in the angle of the housing.

Also located on top of the cover plate, and so arranged that it can project down through a slot 34 in the plate, is a knife sharpening, or edge turning bar 35, held on a bracket 36. The bracket is pivoted in ears 36a on the cover plate, so that the bar can be set to project down into contact with the cutting knife or can be thrown back out of the way.

Mounted in a boss 37 in the ring frame, is a vertical rod 38 which extends from the top to the bottom of the device. On the upper end of this rod is a collar and frame 39 which supports the housing 28. On the bottom of the rod is a like collar and frame 40, which support the receiving housing 41. This housing may be a three sided sheet metal structure, the upper end of which registers with the opening 29 of the top cover, the said upper end of the receiving housing terminating below the lowest position of the adjusting plate.

Located on the vertical rod are a pair of collars 42, 43, which slide on the rod, and carry the projecting plates 44 and 45, which move up and down in the housings 28 and 41. The plate 45 which is to be located above a piece of bread to be cut, has its mounting arm extending out through the slot in the housing 28. The lower face of this plate may be provided with tines to enter the bread and grip it.

The two collars are connected by a rod 46 secured to the lower collar and extending up into a small collar 47, projecting from the collar 43. A set screw 48 in the small collar 47 permits of adjustment and fixing of the spacing between the two collars.

In operation, the piece of bread is set against the upper housing 28, and resting on the slice-adjusting plate; the handle on the hand wheel being in its uppermost position. The adjusting rod between the two collars last noted, is loosened, and the top plate 45 is set onto the top of the loaf of bread. The underneath collar and its plate are then brought up until the under plate 44 is just below the slice-adjusting plate, whereupon the set screw is set, and the machine is ready for operation. In operating the machine, all that is necessary is to turn the hand wheel. The loaf of bread moves down by gravity, keeping its under surface against the slice adjusting plate which sustains it, except when the knife is cutting through the loaf; and as a slice is cut off under the knife, the loaf moves down onto the plate as the knife passes from under it with the just severed slice below the plate. The structure comprising the plates 44 and 45 moves down with the unsliced part of the loaf and the slices, and it will be seen that the downward movement of the bread and this structure is controlled by the bearing of the unsliced upper part of the loaf first on the knife and then on the plate.

The small tongue 25 on the ring frame acts to assure an accurate dropping of each slice on the preceding one, and at the end of the operation, which can be carried on down to the top crust of the loaf, there will be a completely sliced loaf on the under plate, and held against falling by the lower housing.

The sharpening of the knife is accomplished by a mechanism supported beneath the slice-adjusting plate, and which operates through the opening in the adjusting plate when the plate has been lowered and held in fixed position against rotation with the knife.

The sharpening stone is a straight flat member 50, which is held in a casing 51. I have, for convenience, referred to the member 50 as a stone. It may be of steel, carborundum, or other material. The casing 51 is supported on a post 52, from which two actuating pins 53 project laterally. Pivoted on a lug 54 on the central boss 4 of the upper spider frame, is a mounting arm 55, which has an intermediate split boss 56 into which the post 52 projects, and through the slots thereof the two pins 53 project. This arm has a spring pin and handle 57 on its outer end and a plate 58 projects down from the ring frame, so as to provide two positions for the pin, thereby locking the supporting arm in an upper or a lower position. One of the holes for the spring pin is indicated at 59, and the other at 60 (Figs. 6 and 7).

Held between ears 61 on the outer portion of the supporting arm is a lever 62, which has a pair of forked arms 63 that engage over the pins on the sharpener stone post. The post itself projects down through the split boss on the supporting arm, and is held by a spring 64 tending to hold the sharpening stone in its lowermost position.

When the slice-adjusting plate is lowered and fastened, which will be the correct position to permit the sharpener to be thrust up against the knife, the operator raises the supporting arm to its upper position, and pins it there, whereupon he presses down on the lever 62, at the same time revolving the hand wheel. He may also lower the upper sharpener or edge turning bar down through the top cover of the machine into contact with the knife.

The inner end of the casing for the lower or main sharpening stone is provided with a roller 63, and a depending lip 66 formed beneath the knife itself, engages this roller. The lip 66 is shaped as a cam, with the deepest portion of the cam located at a position when the sharpening stone will jump from engagement with the inner portion of the knife edge to the outer portion.

A plunger 67 and dash pot 68 are provided between the blade casing and the supporting arm to take up the shock of striking down the sharpening blade by means of the cam.

The problem of sharpening a spiral bladed knife, without removal from a slicing machine, has never before been successfully solved, so far as I am advised. The difficult feature is to provide for a sharpening bar or stone which presents the correct abrasive surface to the knife blade at the correct angle. By my construction, it will be noted that the sharpening element will be considerably higher in position when sharpening the inner portions of the spiral blade than when sharpening the outer portion, and that the angle of the element to the edge of the blade will always be the same.

The operator will be pressing downwardly on the lever handle so as to press the sharpener up against the blade; and during each cycle of revolution of the knife blade, the lever handle will go down as the inner portions of the knife blade are reached, and then upwardly so as to start on the outer portion of the knife blade again. The upward movement of the handle cannot be left to the operator, and accordingly, I provide the depending cam to force the sharpener down, and provide the lever handle, grasped by the operator to force the sharpener, up.

It is believed that from the foregoing, the principles of my invention, as well as the exact structure and practice thereof in the best form now known to me, will be apparent.

While this structure has been rather specifically set forth, it will be understood that I am not limited to such precise disclosure, and that modifications may occur without departing from the scope of my invention.

Having thus described my invention, what I claim as new and desire to secure by Letters Patent, is:—

1. A slicing machine of the character described, having in combination a frame, a rotary knife in the frame having a spiral cutting edge, and a slice-adjusting plate in the frame rotating with the knife, and adjustably spaced therefrom, said knife and adjusting plate being located in substantially horizontal planes, the latter below the former, means for holding a piece of material to be sliced in contact with the adjusting plate, a receiver for articles being sliced, adjustably secured to the holding means, and a member for mounting said holding means and receiver so as to move by gravity.

2. A slicing machine of the character described, having in combination a frame, a rotary knife in the frame having a spiral cutting edge, a slice-adjusting plate in the frame rotating with the knife, and adjustably spaced therefrom, said adjusting plate cut away so that there is a space therein directly beneath the knife corresponding with the shape of the knife, and a sharpening device for said blade located at a desired angle for sharpening the blade, and movable to and from the blade through the cutaway portion of the adjusting plate.

3. A slicing machine of the character described, having in combination a frame, a rotary knife in the frame having a spiral cutting edge, a slice-adjusting plate in the frame rotating with the knife, and adjustably spaced therefrom, said adjusting plate cut away so that there is a space therein directly beneath the knife corresponding with the shape of the knife, a sharpening device for said blade located at a desired angle for sharpening the blade, and movable to and from the blade through the cutaway portion of the adjusting plate, and means for holding the slice-adjusting plate against movement while the knife is being rotated.

4. A slicing machine of the character described, having in combination a frame, a rotary knife in the frame having a spiral cutting edge, a slice-adjusting plate in the frame rotating with the knife, and adjustably spaced therefrom, said adjusting plate cut away so that there is a space therein directly beneath the knife corresponding with the shape of the knife, a sharpening device for said blade located at a desired angle for sharpening the blade, and movable to and from the blade through the cutaway portion of the adjusting plate, means for holding the slice-adjusting plate against movement while the knife is being rotated, and a mounting member for the sharpening device, said member being adjustable to a position to bring the sharpening device out of the path of the slice-adjusting plate.

5. A slicing machine of the character described, having in combination a frame, a rotary knife in the frame having a spiral cutting edge, a slice-adjusting plate in the frame rotating with the knife, and adjustably spaced therefrom, said adjusting plate cut away so that there is a space therein directly beneath the knife corresponding with the shape of the knife, a sharpening device for said blade located at a desired angle for sharpening the blade, and movable to and from the blade through the cutaway portion of the adjusting plate, a cam projecting along the axis of the blade for forcing the sharpening device away from the blade, and means for manually forcing said device toward the blade.

6. A slicing machine of the character described, having in combination a frame, a rotary knife in the frame having a spiral cutting edge, a slice-adjusting plate in the frame rotating with the knife, and adjustably spaced therefrom, said adjusting plate cut away so that there is a space therein directly beneath the knife corresponding with the shape of the knife, a sharpening device for said blade located at a desired angle for sharpening the blade, and movable to and from the blade through the cutaway portion of the adjusting plate, a cam projecting along the axis of the blade for forcing the sharpening device away from the blade, and means for manually forcing said device toward the blade, and means for holding the slice-adjusting plate against movement while the knife is being revolved for sharpening.

7. In a slicing machine, the combination with a support, a spiral bladed knife revoluble in said support, a mounting member for a sharpener pivotally secured to the frame, and retainable in a position toward and away from the knife, a slideway in said mounting member, a sharpener having means sliding in said slideway, and a lever connected to the last named means for moving the sharpener.

8. In a slicing machine, the combination with a support, a spiral bladed knife revoluble in said support, a mounting member for a sharpener pivotally secured to the frame, and retainable in a position toward and away from the knife, a slideway in said mounting member, a sharpener having means sliding in said slideway, and a lever connected to the last named means for moving the sharpener, a cam projecting axially of the knife and engaging the sharpener to move it away from the knife, said cam structure serving to move the sharpener away from the knife at the point when the inner portions of the blade have been engaged and new engagement with the outer portions of the blade is required.

9. In a slicing machine, the combination with a support, a spiral bladed knife revoluble in said support, a mounting member for a sharpener pivotally secured to the frame, and retainable in a position toward and away from the knife, a slideway in said mounting member, a sharpener having means sliding in said slideway, and a lever connected to the last named means for moving the sharpener, a cam projecting axally of the knife and engaging the sharpener to move it away from the knife, said cam structure serving to move the sharpener away from the knife at the point when the inner portions of the blade have been engaged and new engagement with the outer portions of the blade is required, said mounting member having cushioning means between it and the sharpener.

10. In a slicing machine, a knife having a cutting movement with its cutting edge presented in the direction of said movement, a plate moving with said knife with an edge facing in the opposite direction along said cutting edge but spaced from the plane of cutting movement of said edge, and means comprising engaging elements urged crosswise of and at opposite sides of the path of said cutting edge, one of said elements holding unsliced material to be fed onto said plate across the path of said cutting edge, and the other element confining the slices of said material severed by said cutting edge, the feeding being controlled by the intermittent engagement of the plate with the unsliced material.

11. In a slicing machine, a knife rotating on an upright axis with its cutting edge presented in the direction of its rotation, a plate rotating with said knife with an edge facing in the opposite direction along said cutting edge but spaced downward therefrom, a stationary cover plate above said knife, having an aperture over the path of said knife and plate edges, to admit material to said knife and plate, upper and lower guiding members for the material extending partly around said aperture, respectively, above said stationary plate and below said rotary plate, and members to engage the upper and lower sides of the material movable in unison up and down in the respective guiding members.

12. In a slicing machine comprising a rotary knife with a contour comprising a spiral beveled cutting edge and an abrupt extension from the inner to the outer end of said edge, a sharpener fitting the bevel of said edge and movable to follow said edge from its outer part to its inner part as the knife rotates, means for causing said sharpener to follow said edge, and means operated in unison with the knife rotation to return said sharpener out of the way of said extension to position for again following said edge.

13. In a slicing machine comprising a rotary knife with a contour comprising a spiral beveled cutting edge and an abrupt extension from the inner to the outer end of said edge, a sharpener fitting the bevel of said edge and movable to follow said edge from its outer part to its inner part as the knife rotates, manually operated means for causing said sharpener to follow said edge, and means operated in unison with the knife rotation to return the sharpener out of the way of said extension to position for again following said edge.

14. In a slicing machine comprising a rotary knife with a contour comprising a spiral beveled cutting edge and an abrupt extension from the inner to the outer end of said edge, a sharpener, a movable holder for said sharpener holding said sharpener to fit said edge and to follow said edge from its outer part to its inner part as the knife rotates, means acting on said holder to cause said sharpener to follow said edge, and a cam rotating with said knife, engaging said holder and so arranged as to return the sharpener out of the way of said extension to position for again following said edge.

15. In a slicing machine comprising a rotary knife with a contour comprising a spiral beveled cutting edge and an abrupt extension from the inner to the outer end of said edge, a holder, a sharpener held by said holder to fit said edge, a support for said holder wherein said holder is movable so that the sharpener may follow said edge from its outer to its inner part as the knife rotates, means operated in unison with said knife, engaging said holder to return the sharpener out of the way of said extension to position for again following said edge, as the knife rotates, and means for adjusting said support to hold the sharpener either in or out of position for following said knife edge.

16. In a slicing machine comprising a rotary knife with a spiral cutting edge, a sharpener, a holder for said sharpener, having a stem, a swinging support having a guide opening in which said stem is slidable, a lever fulcrumed on said support and engaging said stem, said guide guiding said holder to press the sharpener to the knife edge under action of said lever, and detent means for holding said swinging support in either one of two positions, one in which the sharpener is held to the knife edge and the other in which the sharpener is held away from said edge.

17. In a slicing machine comprising a movable knife and a material holder urged at right angles to the plane of cutting of the knife, and having means at opposite sides of said plane to support material across said plane and hold the unsliced material and the slices of material together, a slice adjusting element movable in unison with said knife in a plane parallel with and at one side of said plane of cutting, and so arranged relatively to said knife along said plane as to stop movement of the unsliced material through said plane as the knife passes away from the material, and to move away from the material as the knife cuts the material, the feeding being controlled by the intermittent engagement of the slice adjusting element with the unsliced material.

18. In a slicing machine comprising a rotary knife and a material holder movable at right angles to the plane of cutting of the knife, guides at opposite sides of said plane for guiding sliced and unsliced material, a slice adjusting element rotatable with said knife at one side of said plane and having such angular location relative to the knife as to stop movement of unsliced material through said plane as the knife passes away from the material, and to move away from the material as the knife cuts the material, and means fixed between the planes of movement of the knife and the slice adjusting element for preventing displacement of the slices by said knife or said element out of the zone of guidance by said guides.

19. In a slicing machine, a rotary knife and a slice adjusting plate rotatable together in axially spaced planes, and means for feeding material to said knife and plate, the contour of said knife comprising a cutting edge presented in the direction of rotation in the form of a spiral which extends the major portion of the circle of rotation and a following edge receding in rotational direction, in its radially inward extent, from the radius that meets the outer end of the knife, and said plate having an aperture of the same contour as and registering with the contour of the knife, and being substantially continuous within its circle of rotation except for said aperture.

20. In a slicing machine, a knife and a slice gauge movable in timed relation, the knife acting to slice the material and the slice gauge acting to gauge the advance of the material, and elements passed by the knife and slice gauge and movable as a unit at an angle to the direction of slicing, one element acting to press the unsliced material toward the knife and slice gauge, and the other element having a surface presented toward the knife as it is passed by the knife to receive the slices from said knife and slice gauge, said knife, when passing across the surface, defining a freely open space with substantially parallel sides, one of which is formed by said surface and the other of which is formed by the adjacent side of the knife, whereby the slices pass to said surface directly from said knife and, throughout their passage and after they are received by said surface, are kept in substantially the posture and alinement they had before being sliced.

21. In a slicing machine, a knife and a slice gauge movable in timed relation, the knife acting to slice the material and the slice gauge acting to gauge the advance of the material, and elements passed by the knife and slice gauge and movable as a unit at an angle to the direction of slicing, one element acting to press the unsliced material toward the knife and slice gauge, and the other element having a surface presented toward the knife as it is passed by the knife to receive the slices from said knife and slice gauge, said knife when passing across said surface, defining a freely open space with substantially parallel sides, one of which is formed by said surface and the other of which is formed by the adjacent side of the knife, whereby the slices pass to said surface directly from said knife and, throughout their passage after they are received by said surface, are kept in substantially the posture and alinement they had before being sliced, and a fixed stop positioned to be engaged by an edge of each slice when the slice is engaged by both the knife and slice gauge, to resist movement of the slices out of their aforesaid alinement, which movement would result from the engagement of the knife and slice gauge with the slices.

ELMER G. STRECKFUSS.